US012596172B2

(12) United States Patent
Zou et al.

(10) Patent No.: US 12,596,172 B2
(45) Date of Patent: Apr. 7, 2026

(54) RADAR IMPLEMENTATION IN A COMMUNICATION DEVICE

(71) Applicant: Telefonaktiebolaget LM Ericsson (publ), Stockholm (SE)

(72) Inventors: Gang Zou, Lund (SE); Henrik Sjöland, Lund (SE); Fredrik Dahlgren, Lund (SE); Ashkan Kalantari, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 18/013,644

(22) PCT Filed: Jul. 10, 2020

(86) PCT No.: PCT/EP2020/069491
§ 371 (c)(1),
(2) Date: Dec. 29, 2022

(87) PCT Pub. No.: WO2022/008063
PCT Pub. Date: Jan. 13, 2022

(65) Prior Publication Data
US 2023/0341510 A1 Oct. 26, 2023

(51) Int. Cl.
*G01S 7/00* (2006.01)
*G01S 7/282* (2006.01)
(Continued)

(52) U.S. Cl.
CPC ............. *G01S 7/006* (2013.01); *G01S 7/282* (2013.01); *G01S 13/282* (2013.01); *H04B 1/401* (2013.01)

(58) Field of Classification Search
CPC ........ G01S 7/006; G01S 7/282; G01S 13/282; G01S 7/023; H04B 1/401
See application file for complete search history.

(56) References Cited

U.S. PATENT DOCUMENTS 8,004,454 B2    8/2011   Lindoff et al.
9,712,356 B2    7/2017   Vijayasankar et al.
(Continued)

FOREIGN PATENT DOCUMENTS

CN      119483643 A    2/2025
EP      3572828 A1    11/2019
(Continued)

OTHER PUBLICATIONS

PCT International Search Report, mailed Apr. 22, 2021, in connection with International Application No. PCT/EP2020/069491, all pages.

(Continued)

*Primary Examiner* — William Kelleher
*Assistant Examiner* — Kenneth W Good
(74) *Attorney, Agent, or Firm* — Murphy, Bilak & Homiller, PLLC

(57) ABSTRACT

A communication device comprises a modem and a transceiver, wherein the modem comprises digital baseband circuitry for generating a digital baseband signal for transmission, and the transceiver is configured to receive the digital baseband signal from the modem and to generate therefrom a radiofrequency signal for transmission by the communication device. The communication device controls the modem to operate in a first mode, and controls the modem to operate in a second mode. The first mode is a radar mode in which the modem generates radar baseband signals for transmission as one or more radar radiofrequency signals by the transceiver, and the second mode is a communication mode in which the modem generates information-containing baseband signals for transmission by the transceiver.

30 Claims, 14 Drawing Sheets

(51) Int. Cl.
G01S 13/28 (2006.01)
H04B 1/401 (2015.01)

(56) References Cited

U.S. PATENT DOCUMENTS

| | | | |
|---|---|---|---|
| 9,945,934 | B2 | 4/2018 | Corcos et al. |
| 11,385,323 | B2 | 7/2022 | Gulati et al. |
| 2003/0102997 | A1 | 6/2003 | Levin et al. |
| 2014/0022108 | A1* | 1/2014 | Alberth, Jr. .......... G01S 13/867 |
| | | | 342/52 |
| 2017/0329449 | A1 | 11/2017 | Silverstein et al. |
| 2018/0092086 | A1 | 3/2018 | Nammi et al. |
| 2018/0252809 | A1* | 9/2018 | Davis ................... G01S 7/0233 |
| 2018/0348340 | A1* | 12/2018 | Lien ...................... G01S 7/2813 |
| 2019/0044551 | A1* | 2/2019 | Dinc ................... H04B 1/0082 |
| 2019/0250261 | A1 | 8/2019 | Itkin |
| 2019/0305859 | A1 | 10/2019 | Rimini et al. |
| 2019/0391246 | A1 | 12/2019 | Dammert et al. |
| 2020/0162225 | A1 | 5/2020 | Chen Larsson et al. |
| 2022/0141804 | A1 | 5/2022 | Bayesteh et al. |
| 2024/0085519 | A1* | 3/2024 | Alalusi ................. G01S 7/2886 |

FOREIGN PATENT DOCUMENTS

| | | |
|---|---|---|
| JP | 2022174770 A | 11/2022 |
| WO | 2020191608 A1 | 10/2020 |
| WO | 2021239226 A1 | 12/2021 |
| WO | 2024184971 A1 | 9/2024 |
| WO | 2024186248 A1 | 9/2024 |

OTHER PUBLICATIONS

PCT Written Opinion, mailed Apr. 22, 2021, in connection with International Application No. PCT/EP2020/069491, all pages.

Barneto, C.B. et al., "Full-Duplex OFDM Radar With LTE and 5G NR Waveforms: Challenges, Solutions, and Measurements", IEEE Transactions on Microwave Theory and Techniques, 2019, pp. 4042-4054, vol. 67, No. 10.

Sturm, C. et al., "Waveform Design and Signal Processing Aspects for Fusion of Wireless Communications and Radar Sensing", Proceedings of the IEEE | vol. 99, No. 7, Jul. 2011, pp. 1236-1259.

Han, L. et al., "Joint wireless communication and radar sensing systems—state of the art and future prospects", Published in IET Microwaves, Antennas & Propagation, Revised on May 23, 2013, Accepted on May 24, 2013, p. 876-885.

Paul, B. et al., "Survey of RF Communications and Sensing Convergence Research", IEEE Access. accepted Dec. 1, 2016, date of publication Dec. 13, 2016, date of current version Feb. 25, 2017, pp. 252-270.

Garmatyuk, et al., "Feasibility Study of a Multi-Carrier Dual-Use Imaging Radar and Communication System", Proceedings of the 4th European Radar Conference, Oct. 2007, pp. 194-197.

Hakobyan, et al., "Repeated Symbols OFDM-MIMO Radar at 24 GHz", Proceedings of the 13th European Radar Conference, Oct. 5-7, 2016, pp. 249-252.

Al-Juboori, et al., "A Comparison of OFDM and GFDM-based MFSK Modulation Schemes for Robust IoT Applications", IEEE 85th Vehicular Technology Conference (VTC Spring), 2017, pp. 1-5.

Al-Juboori, et al., "Feasibility Study of OFDM-MFSK Modulation Scheme for Smart Metering Technology", IEEE PES Innovative Smart Grid Technologies Conference Europe (ISGT-Europe), Sep. 2017, pp. 1-6.

Beard, et al., "Wireless Communication Networks and Systems", Pearson, University of Missouri—Kansas City, Global Edition, 2016, pp. 1-608.

Brandes, et al., "Reduction of Out-of-Band Radiation in OFDM Systems by Insertion of Cancellation Carriers", IEEE Communications Letters, vol. 10, No. 6, Jun. 2006, pp. 420-422.

Farhang-Boroujeny, et al., "OFDM Versus Filter Bank Multicarrier", Development of broadband communication systems, IEEE Signal Processing Magazine, vol. 28, issue 3, May 2011, pp. 1-21.

Polgar, et al., "OFDM Transceiver with Adaptive Modulation Implemented in GNU Radio", IEEE, 2023, pp. 37-42.

Thiasiriphet, et al., "Combining OFDM-MFSK and Chirp Spread Spectrum Modulation for Applications in Low-Power Wide-Area Networks", 2021 15th International Conference on Signal Processing and Communication Systems (ICSPCS), 2021, pp. 1-8.

Unknown, Author, "Federal Communications Commission", FCC 18-149, Before the Federal Communications Commission, Washington, DC., 20554, Oct. 24, 2018, pp. 1-100.

Unknown, Author, "Unwanted Emissions in the Out-of-Band Domain", SM Series Spectrum Management, Recommendation ITU-R SM. 1541-6, Aug. 2015, pp. 1-80.

Unknown, Author, "Unwanted Emissions in the Spurious Domain", SM Spectrum Management, Recommendation ITU-R SM.329-12, Sep. 2012, pp. 1-41.

Xiaohong, et al., "Dynamic Modulation and Bandwidth Optimization for UUV Underwater Acoustic Communication System", ICSP2006 Proceedings, Jan. 2006, pp. 1-4.

Zhang, et al., "A Spectrum Effective Adaptive Modulation and Coding Scheme for OFDM System", IEEE, 2008, pp. 1-5.

* cited by examiner

400

Modem UL + Radar Processing

UL Data

401

CRC attachment

Channel coding

Rate matching

Codeword reconstruction

Scrambling

Modulation mapper

DFT

Precoding

Layer mapping

403

407

Radar sequence generation

Resource element mapping — 405

409

OFDM signal generation (IFFT) — 411

Beamforming — 413

Transmitted radar signal (+ possibly transmitted data)

900

Start

Operate modem in radar mode (transmit one or more radar signals) ⌒ 901

Operate modem in communication mode (transmit one or more information-containing signals) ⌒ 903

950

Start

Operate modem in radar mode (transmit one or more radar signals) ⌒ 951

Operate modem in communication mode (transmit one or more information-containing signals) ⌒ 953

RADAR IMPLEMENTATION IN A COMMUNICATION DEVICE

BACKGROUND

The present invention relates to radar equipment, and more particularly to radar equipment implemented in a communication device.

There is a growing need for applications that run in mobile phones and other types of modem-equipped devices to be aware of objects and events in their surroundings as well as their position. Different sensor options for enabling this awareness include radar and cameras. There is no need to exclude one option in favor of another because information from different sensors can be combined in a process called "sensor fusion" to create a more complete picture.

Conventional technology has considered providing a mechanism for making mobile communication devices radar-capable. For example, both US Patent Application No. US 20170329449A1 (B. Silverstein and Eden Sherry, "Systems, Methods, and Devices for Utilizing Radar-Based Touch Interfaces", November 2017) and U.S. Pat. No. 8,004,454B2 (M. Lindoff and M. Blomkvist, "Mobile Electronic Device Equipped With Radar", Aug. 23, 2011) describe equipping such devices with a dedicated radar chip so that they can detect objects in the vicinity. But while most mobile phones have a camera, radar sensors are still not widely implemented. One rare exception is the Google Pixel 4 phone, which incorporates a dedicated radar chip to achieve the desired functionality.

The current solution for equipping communication devices with radar capability has only a short range application that requires only low resolution (e.g., gesture recognition and detecting objects in proximity of the device). In addition, the current solutions requiring dedicated radar chips inside the mobile device lead to increased cost and the need provide additional space in the device.

As another solution, U.S. Pat. No. 9,945,934 B2 (D. Corcos and D. Elad, "Radar Integration With Handheld Electronic Devices", April 2018) describes mounting a phased array on the device to add a frequency modulated continuous wave (FMCW) radar. Such a solution is proposed for vehicle communication.

However, integrating long-range and high-resolution radar chips inside the mobile phones or mounting a radar enabling mounting case on the device can increase the cost and size of a mobile device substantially. The reason is that the size of an antenna array must be many wavelengths to create a narrow beam for high angular resolution.

There is therefore a need for radar-enabling technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that includes a communication device having a modem and a transceiver, wherein the modem comprises digital baseband circuitry for generating a digital baseband signal for transmission, and the transceiver is configured to receive the digital baseband signal from the modem and to generate therefrom a radiofrequency signal for transmission by the communication device. The communication device controls the modem to operate in a first mode, and controls the modem to operate in a second mode. The first mode is a radar mode in which the modem generates radar baseband signals for transmission as one or more radar radiofrequency signals by the transceiver, and the second mode is a communication mode in which the modem generates information-containing baseband signals for transmission by the transceiver.

In accordance with an aspect of some embodiments consistent with the invention, the modem further comprises radar signal processing circuitry, and operating the modem in the first mode comprises receiving a baseband radar reflection signal from the transceiver; and operating the radar signal processing circuitry using the received baseband radar reflection signal as input.

In accordance with an aspect of some embodiments consistent with the invention, a signal correlation is performed using the radar baseband signals as reference signals against which the baseband radar reflection signal is compared.

In accordance with an aspect of some embodiments consistent with the invention, when operating in the first mode, the modem is configured to generate the radar baseband signal from a radar baseband sequence. In some of these embodiments, this includes generating the radar baseband sequence; and supplying the radar baseband sequence to an Orthogonal Frequency Division Multiplexing, OFDM, modulator, wherein the radar baseband sequence is configured to cause the transceiver to generate the one or more radar radiofrequency signals as one or more OFDM pulses. When operating in the second mode data representing information is supplied to the OFDM modulator, wherein the data representing information causes the transceiver to generate the radiofrequency signal as information-containing OFDM symbols.

In some but not necessarily all of these embodiments, supplying the radar baseband sequence to the OFDM modulator comprises supplying the radar baseband sequence to a resource element mapping portion of the OFDM modulator that is also used by the modem when operating in the second mode.

In some alternative embodiments, operating in the first mode includes generating the radar baseband sequence as a sequence configured to cause the transceiver to generate the one or more radar radiofrequency signals as one or more Frequency Modulation Continuous Wave, FMCW, signals.

In accordance with an aspect of some embodiments consistent with the invention, the one or more radar radiofrequency signals are transmitted in a directional beam.

In accordance with an aspect of some embodiments consistent with the invention, one or more antenna panels are used when transmitting the one or more radar radiofrequency signals.

In accordance with an aspect of some embodiments consistent with the invention, the radar baseband sequence is selected from at least a first radar baseband sequence and a second radar baseband sequence, wherein the first radar baseband sequence causes the one or more radar radiofrequency signals to have a first pulse width and a first amplitude, and the second radar baseband sequence causes the one or more radar radiofrequency signals to have a second pulse width and a second amplitude. The radar radiofrequency signals produced from the first radar baseband sequence differ from the radar radiofrequency signals produced from the second radar baseband sequence by at least one of:

the first pulse width having a different duration than the second pulse width; and the first amplitude having a different magnitude than the second amplitude.

In accordance with an aspect of some embodiments consistent with the invention, the communication device is configured to base selection of the radar baseband sequence on a targeted detection range interval.

In accordance with an aspect of some embodiments consistent with the invention, the one or more radar radiofrequency signals are transmitted using an unlicensed portion of a radiofrequency spectrum.

In accordance with an aspect of some embodiments consistent with the invention, the communication device operates in a time duplex mode in which transmission of the one or more radar radiofrequency signals and reception of radar reflection signals occur at non-overlapping times.

In accordance with an aspect of some embodiments consistent with the invention, the communication device operates in a full duplex mode in which transmission of the one or more radar radiofrequency signals and reception of radar reflection signals occur at overlapping times.

In accordance with an aspect of some embodiments consistent with the invention, the communication device is a millimeter wave, mmWave, communication device.

In accordance with an aspect of some embodiments consistent with the invention, the communication device is configured for operation in a 5G communication network.

In accordance with an aspect of some embodiments consistent with the invention, the modem operates in the first mode and in the second mode.

BRIEF DESCRIPTION OF THE DRAWINGS

The objects and advantages of the invention will be understood by reading the following detailed description in conjunction with the drawings in which.

DETAILED DESCRIPTION

Figure 1A:
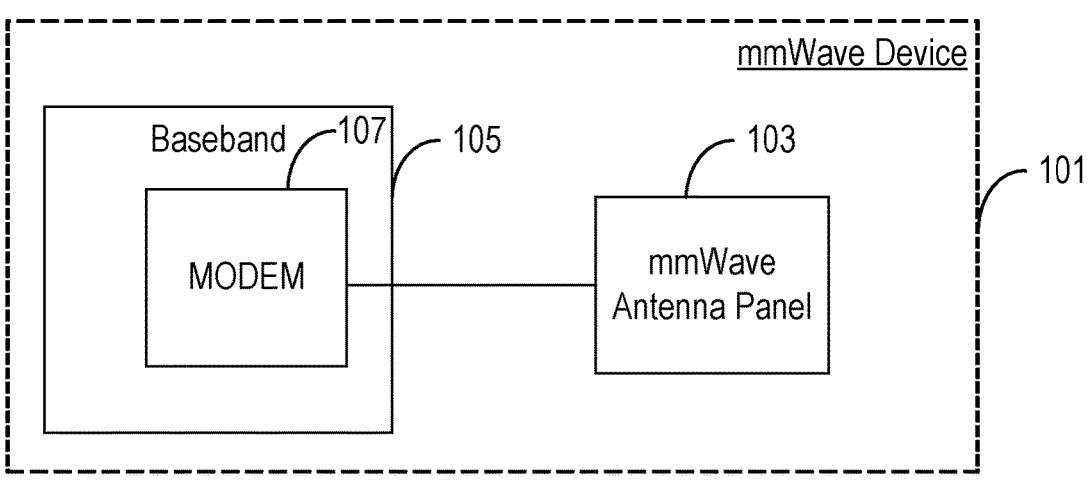
FIG. 1A is a block diagram of an exemplary 5G TDD mmWave device.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology is the addition of radar functionality to a mmWave communication device (such as a 5G cellular phone) with slight hardware modifications, where the 5G beamforming mmWave transceiver, together with its RF front end components and antenna array, are shared between radar and communication modem. In a mmWave communication device, the RF transceiver, RF front-end components and the antenna array are generally integrated into a single module, called "antenna panel", or "antenna module". The term "antenna panel" is used herein to refer to such a module.

There are different ways in which radar functionality can be performed. One of these is "monostatic radar" in which a single device both transmits a radar signal and receives its reflections. Monostatic radar requires a radar device whose transmitter and receiver are collocated.

In one alternative, "bistatic radar" is a radar system comprising a transmitter and receiver that are separated by a distance that is typically comparable to the expected target distance.

And in another alternative, "multistatic radar" is a radar system containing multiple spatially diverse monostatic radar and/or bistatic radar components with a shared area of coverage. It can contain one or more receivers processing reflected signals from one or more geographically separated transmitters. For example, the radar system may include one receiver and multiple transmitters, or multiple receiver and one transmitter, or multiple receivers and multiple transmitters.

The technology can be embodied in a number of different ways:

1. Embodiments suitable for communication devices in which the modem and radar baseband are implemented in separated hardware. In such embodiments, the modem and radar basebands are connected to the antenna panel via a switch.

2. Embodiments suitable for communication devices that do not have a separate radar baseband circuitry. In such embodiments, modem baseband hardware that supports communication functions (i.e., sending and receiving information-containing signals) is shared with radar functionality, using a same data bus between the two. The radar/communication sharing function can be time duplex (radar and communication signals are allocated to different symbols in time domain), frequency duplex (when the radar and communication signals are allocated to different radio frequency spectrums), polarization duplex (modem and radar signals are allocated to different polarizations of an antenna panel), or spatial duplex (modem and radar signals are allocated to different beams). The combination of these duplex methods can be implemented by a device.

Depending on its RF circuit and radar mode, the communication device can generate different types of radar signals. For example, For a device acting as monostatic radar:

When it is equipped with a full-duplex radio frequency (RF) transceiver (i.e., the device can simultaneously transmit and receive an RF signal), an Orthogonal Frequency Division Multiplex (OFDM) symbol can be generated as a radar signal. In fact, any signal format supported by the transceiver can be considered for adoption as a radar pulse and shaped to comply with regulatory requirements. In the following we use the term OFDM for simplicity of discussion, but any other supported format may also be considered and should be considered to be covered in the OFDM-oriented discussion.

When it is equipped with fast Tx/Rx antenna switches, a short duration RF pulse or a train of pulses in an OFDM symbol can be generated as a radar signal.

When two or more devices coordinate to function as a bistatic or multi-static radar group, Here, the devices do not need to have a full-duplex RF transceiver since it is sufficient to only transmit or only receive radar signals. An OFDM symbol can be generated as a radar signal for the devices, with at least one transmitting the radar signal and at least one receiving reflections of that signal.

FIG. 1A is a block diagram of an exemplary 5G TDD mmWave device 101. It mainly includes an RF part 103 (i.e. antenna panel) and a digital baseband part 105. The RF part 103 is responsible for transmitting/receiving an RF signal including upconverting a baseband signal to an RF signal for transmission and down-converting a received RF signal to a baseband signal for reception. The digital baseband part 105 is responsible for uplink and downlink data processing, and includes a modem 107.

Figure 1B:
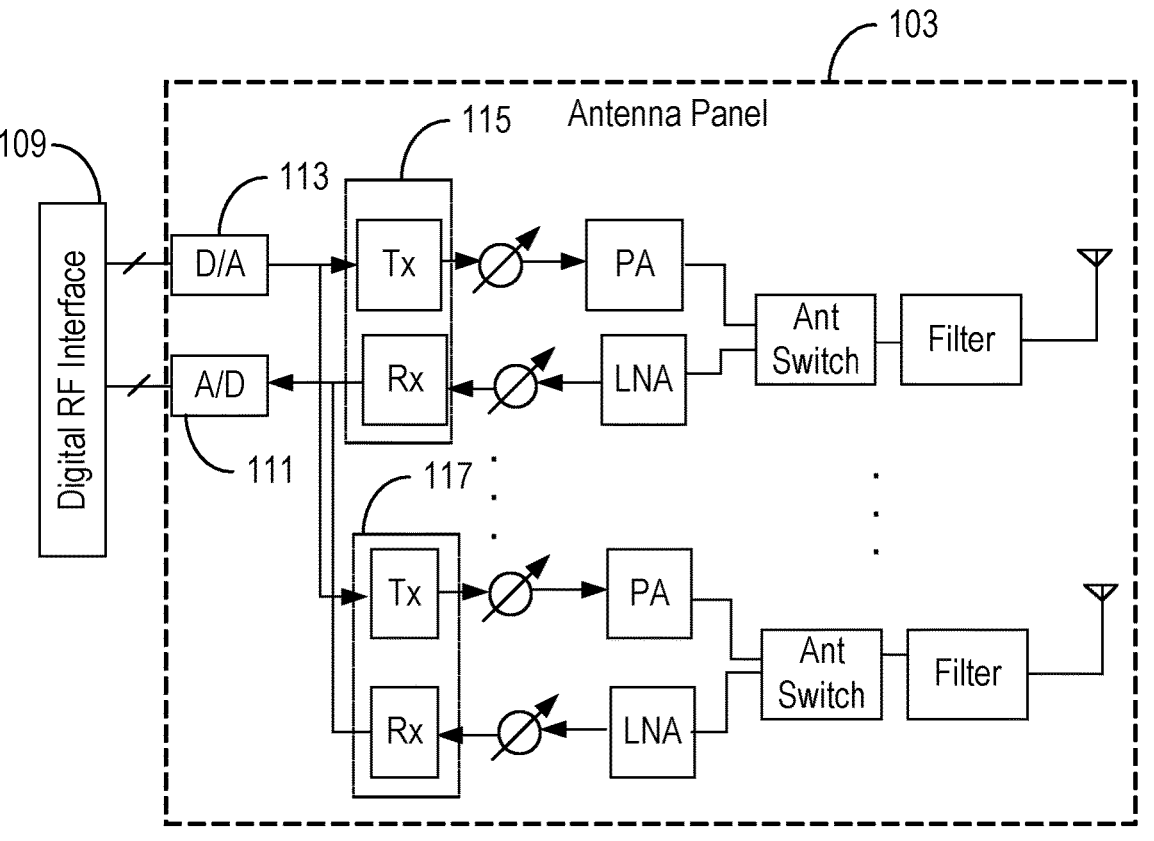
FIG. 1B is a block diagram showing some aspects of the 5G TDD mmWave device in further detail.

FIG. 1B is a block diagram showing some aspects of the 5G TDD mmWave device 101 in further detail. A digital RF interface 109 is provided to enable the baseband part 105 and RF part 103 to exchange data via analog-to-digital (A/D) and digital-to-analog (D/A) converters 111, 113. An intermediate frequency (IF) conversion stage may be included in Rx/Tx blocks 115, 117 so that the mmWave frequency signal can be down-converted/up-converted to/from IF signal which can be further down-converted/up-converted to/from baseband signal. The A/D, D/A converters 111, 113 and the IF conversion stage may be integrated with the baseband part 105 instead of the antenna panel 103.

When implemented as a monostatic radar, the mmWave transceiver needs to receive and transmit radar signals simultaneously, or pseudo-simultaneously by quickly switching between reception and transmission. A fast antenna switch can be implemented so it can switch extremely fast between receive and transmit modes. This would have a much lower cost than adding reliable and high isolation between the transmitter and receiver. A description of one example of a suitable fast antenna switch can be found in PCT Patent Application Number PCT/EP2020/064810, filed on May 8, 2020 and entitled "Fast Antenna Switch".

Figure 2A:
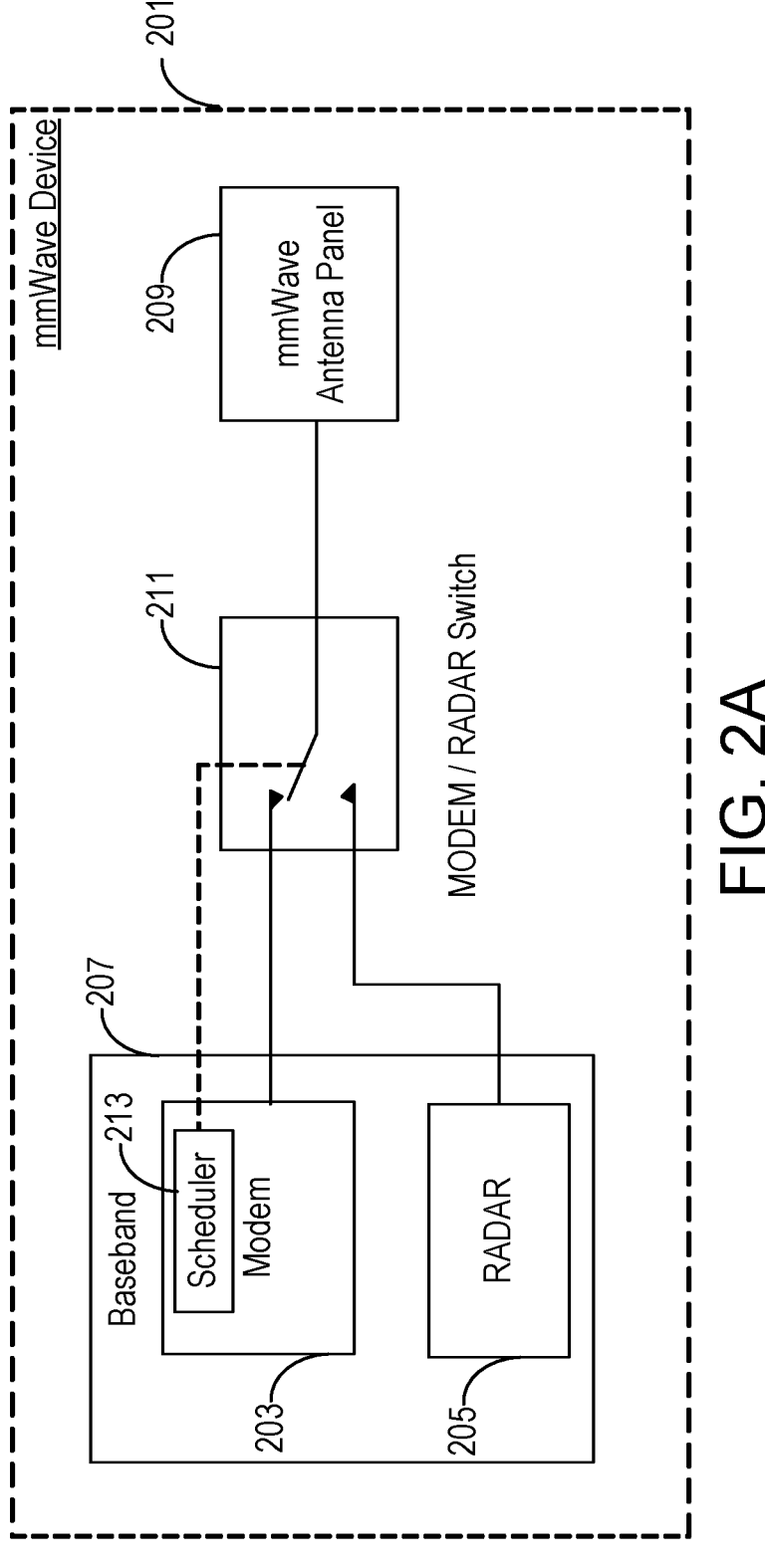
FIG. 2A is a block diagram of a mmWave device in which a data communications modem and radar baseband circuitry are implemented separately within a baseband part of the device.

FIG. 2A is a block diagram of a mmWave device 201 in which a data communications modem 203 and radar baseband circuitry 205 are implemented separately within a baseband part 207 of the device 201. The separately supplied baseband signals from the modem 203 and from the radar baseband 205 are connected to an antenna panel 209 which includes a transceiver 204 via a switch 211.

Figure 2B:
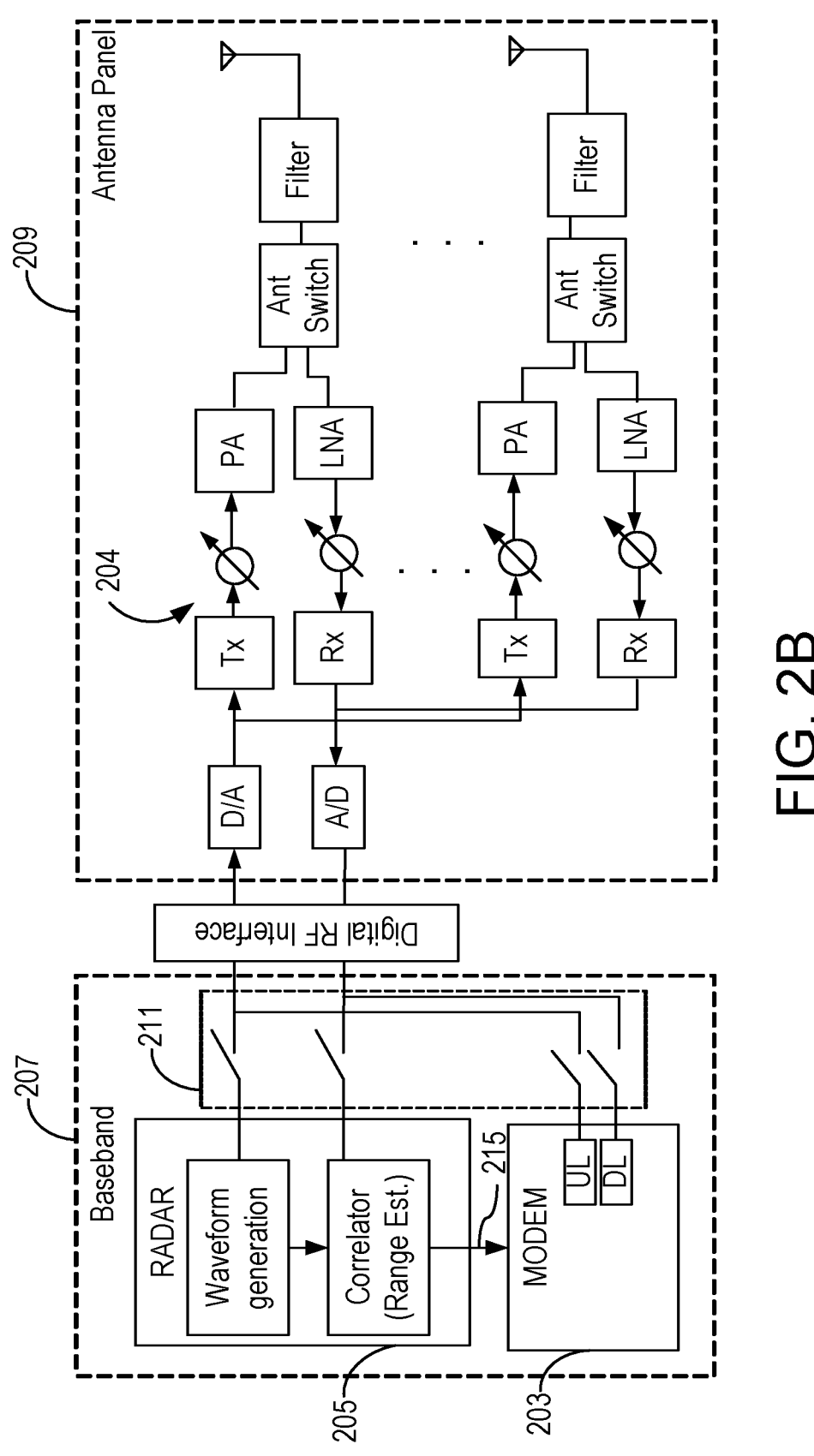
FIG. 2B is a block diagram illustrating parts of the exemplary mmWave device of FIG. 2A in greater detail.

FIG. 2B is a block diagram illustrating parts of the exemplary mmWave device 201 in greater detail. The switch 211 can be controlled by a timer-based modem scheduler 213 (shown in FIG. 2A) in the device 201. (If communication/radar latency is not a concern or can in some way be made manageable, the scheduler may be located outside of the baseband part 207, such as with the radar application.) The scheduler 213 gathers information about the upcoming communication/radar activities which may be scheduled/granted by a base station, a side link, or software application.

The exemplary embodiment illustrated in FIG. 2B also includes a connection 215 between the radar part 205 and the modem 203. The connection need not be included in all embodiments, and is provided for communicating radar information to the modem 203 so that the modem 203 can then communicate the radar information to a base station or server.

Figure 3A:
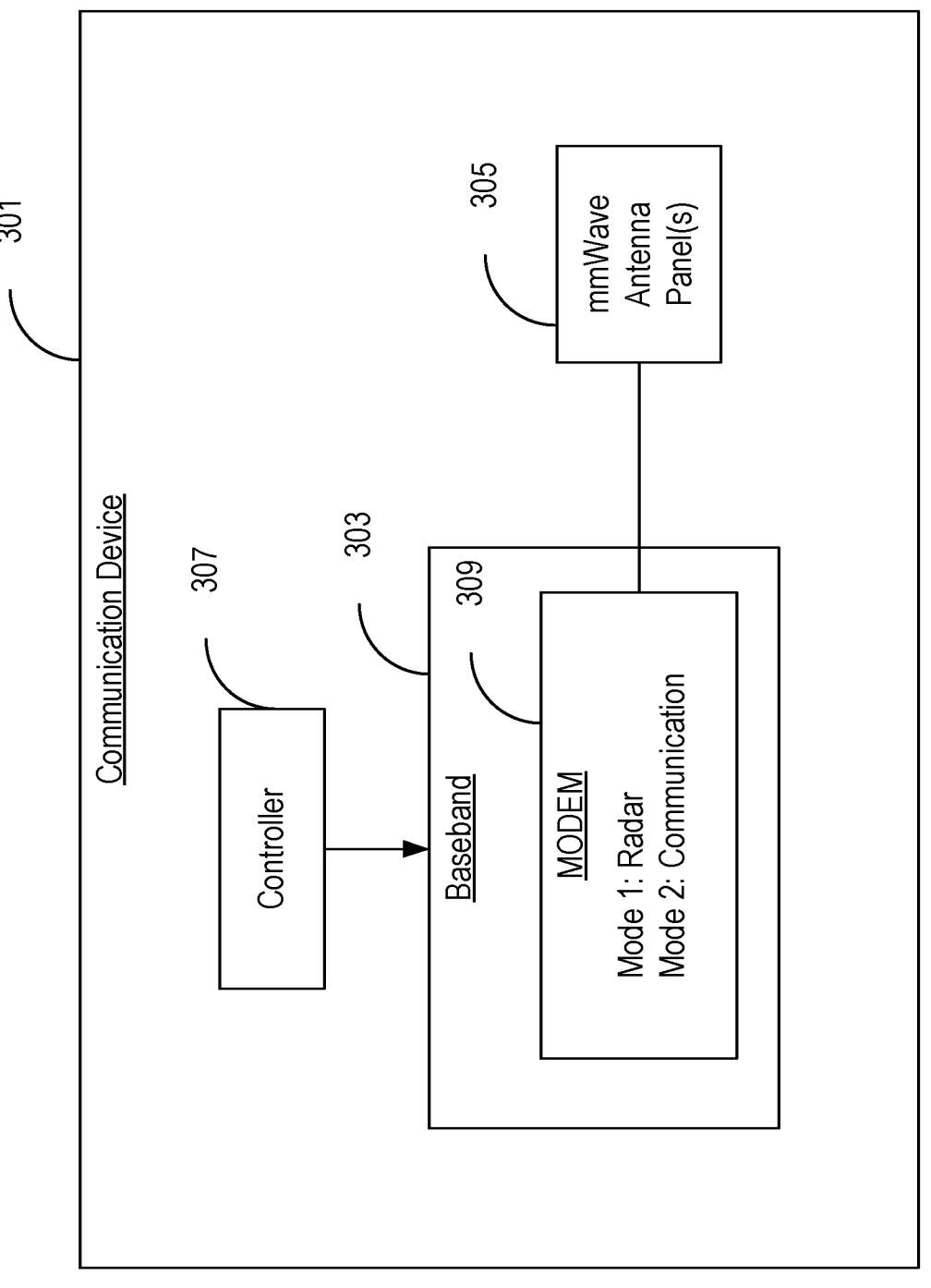
FIG. 3A is a block diagram of a communication device having a baseband part coupled to one or more mmWave antenna panels, and a controller.

To further lower the hardware cost associated with providing radar capability in a communication device, the radar baseband processing can be implemented in the modem baseband, that is, using the modem (or part of the modem)

to realize radar functions. An exemplary embodiment is shown in FIG. 3A, which is a block diagram of a communication device 301 having a baseband part 303 coupled to one or more mmWave antenna panels 305. A controller 307 is also included for controlling elements of the communication device 301 including the baseband part 303.

The baseband part 303 includes a modem 309 that, in an aspect of embodiments consistent with the invention, is capable of operating in two different modes:

a first, "radar" mode in which the modem 309 generates baseband radar signals for transmission as one or more radar signals by the transceiver 304 via the mmWave antenna panel(s) 305; and a second, "communication" mode in which the modem 309 generates baseband information-containing signals for transmission by the transceiver 304.

Figure 3B:
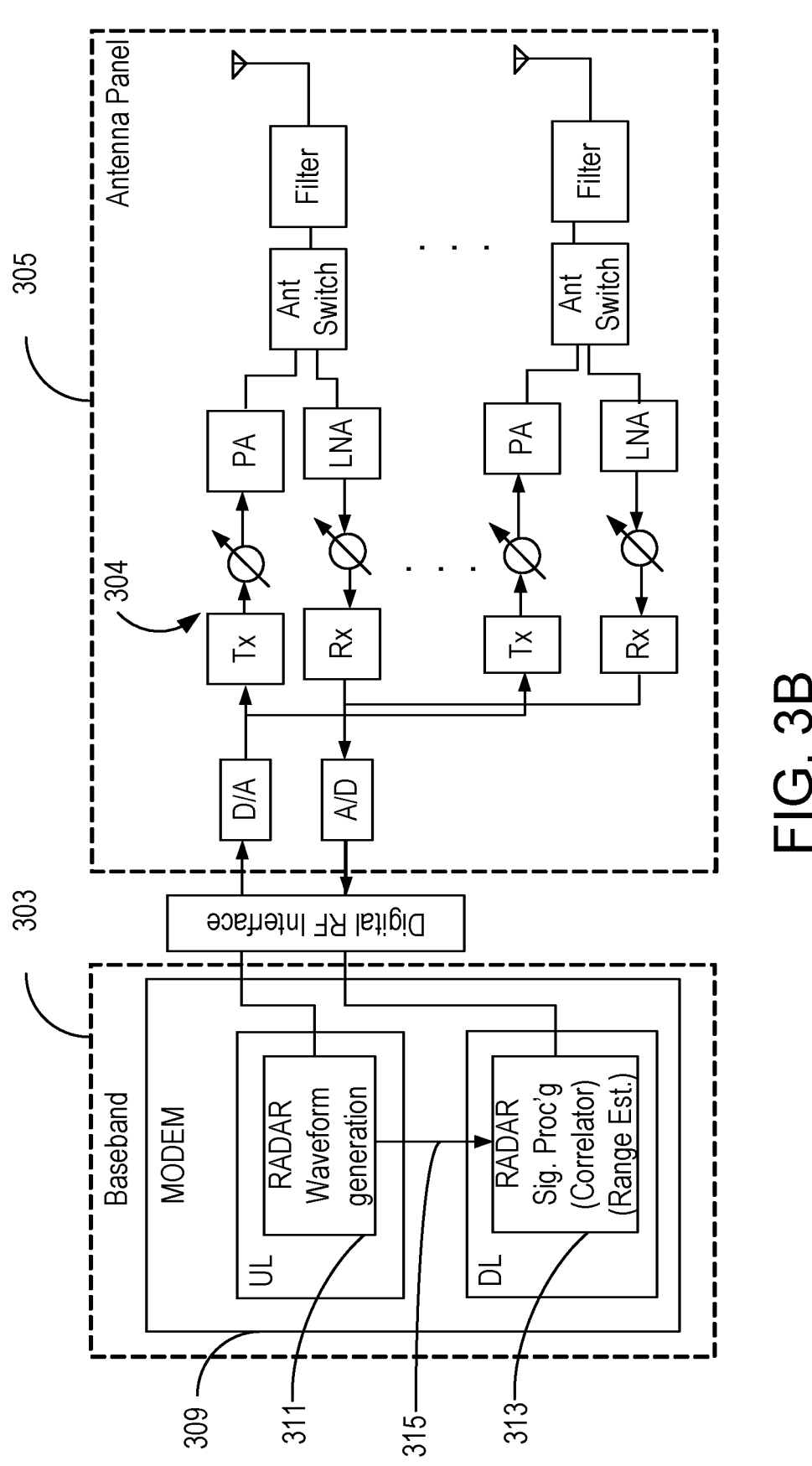
FIG. 3B is a block diagram that illustrates aspects of the exemplary communication device 301 of FIG. 3A in greater detail.

Aspects of the exemplary communication device 301 of FIG. 3A are illustrated in greater detail in the block diagram of FIG. 3B. It can be seen that the baseband modem 309, which is used by the device 301 for uplink and downlink communication of information-bearing data, is also configured to include one or both of:

in an uplink (UL) part of the modem 309, a modem part 311 configured to generate a radar signal for transmission via the antenna panel(s) 305;

in a downlink (DL) part of the modem 309, a modem part 313 configured to process a received radar signal.

Aspects of a communication device such as the exemplary communication device 301 will now be described in greater detail, beginning with a discussion of radar signal generation by the modem 309.

Depending on its RF circuit and radar mode configuration, the communication device 301 can generate different types of radar signals. For example, for a device acting as a monostatic radar device, possible configurations depend on whether the device is capable of full-duplex operation or time-duplex operation:

When the device is equipped with a full-duplex RF transceiver, it can simultaneously transmit the radar signal and receive the reflected signal. The isolation between Tx and Rx can be achieved by self-interference suppression, such as a method presented in reference [5]. An OFDM symbol can then be generated and used as radar signal. The OFDM radar signal has been shown to offer radar performance advantages, like high dynamic range, possibility of estimating the relative velocity and efficient implementation based on Fast Fourier Transform (FFT) [6].

In one embodiment, using OFDM symbols for radar, a possibility is to use the symbols anyway sent out for communication also for radar. In fact, the radar impulse response (echoes) may anyway have to be estimated by the full duplex communication modem, to be able to perform sufficient cancellation of the Tx to Rx signal transfer. The benefit here is no RF interference between the communication and the radar functions.

In another embodiment, when the device containing multiple antenna panels, it can use one antenna panel(s) for radar signal transmission; use another antenna panel(s) for radar signal reception, similar to a bi-static radar. The device may perform this in different orientation; or perform sequential send and receive on different panels to better scan the environment or find better receiving panels.

In another embodiment, the device can use a group of antenna elements of an antenna panel for radar signal transmission; while use another group of antenna elements for radar signal reception.

The radar signal is not limited to OFDM, other radar waveforms can also be generated, e.g., Frequency Modulation Continuous Wave (FMCW).

When the device is equipped with fast Tx/Rx antenna switches, a short duration RF pulse or a train of pulses fitted in an OFDM symbol can be generated as radar signal.

For two devices acting as a bistatic radar, neither device is required to have full-duplex RF transceiver capability, so this is not a necessary consideration. An OFDM symbol can be generated by one of the devices as a radar signal for reception as a radar signal reflection by the other. Of course, the same is also viable when there are more than two devices configured as a multistatic radar group.

Figure 4:
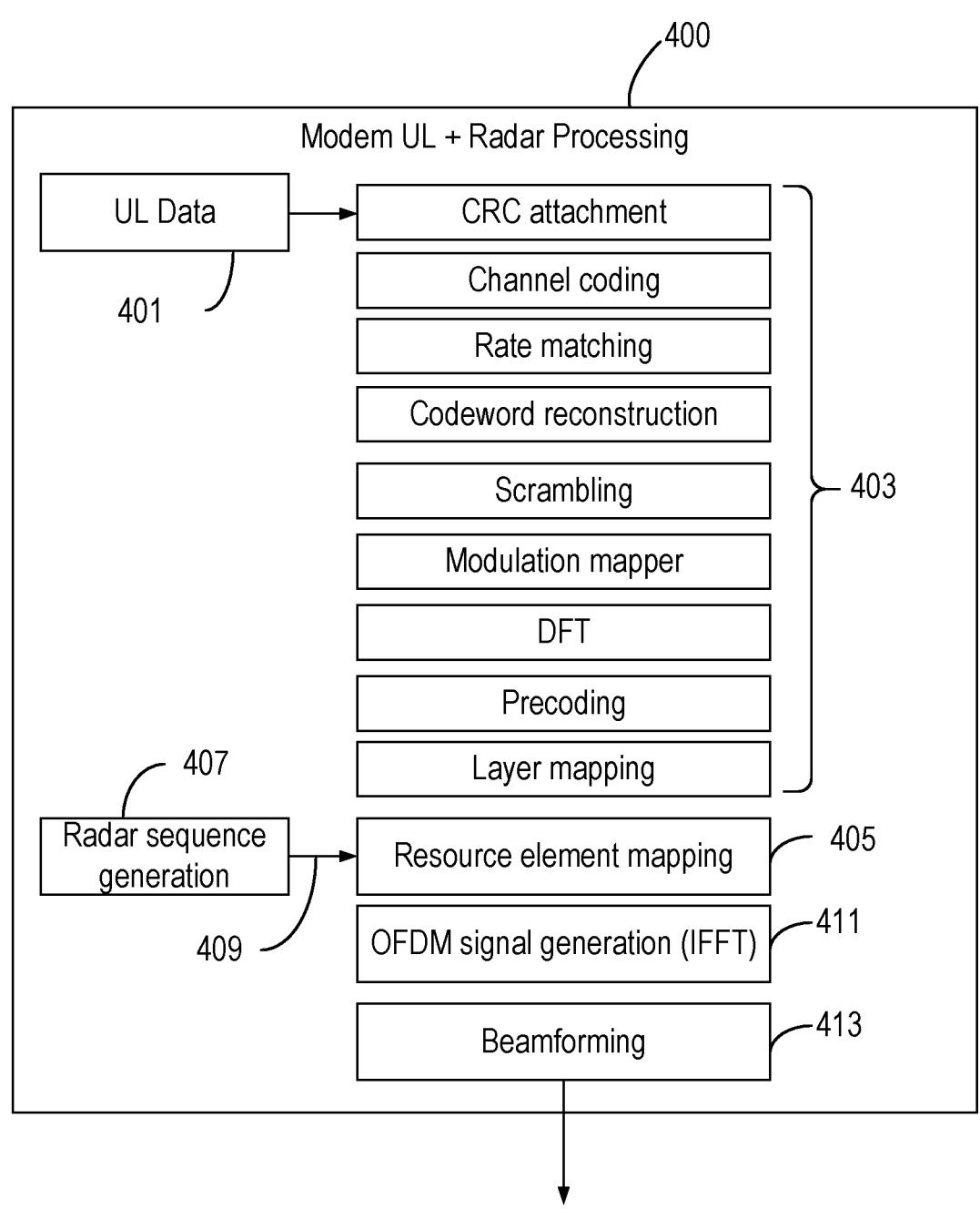
FIG. 4 is, in one respect, a flowchart of actions in accordance with exemplary embodiments corresponding to uplink data and radar processing.

As mentioned above, a number of embodiments configure an OFDM symbol for use as a radar signal that can be generated by, and transmitted from, the communications device. In the modem 309, an OFDM radar signal is generated from a radar sequence injected to the OFDM modulator, and mapped to antenna panels for beamforming. Looking at this in more detail, FIG. 4 is, in one respect, a flowchart of actions in accordance with exemplary embodiments corresponding to uplink data and radar processing as just mentioned. In another respect, the blocks depicted in FIG. 4 can also be considered to represent means 400 (e.g., hardwired or programmable circuitry or other processing means) for carrying out the described actions.

As is typical in a modem found in a communication device configured to transmit OFDM signals, data intended for uplink transmission 401 is generated and supplied to the modem 309 where it undergoes initial processing 403 that includes:

cyclic redundancy check attachment
channel coding
rate matching
codeword reconstruction
scrambling
modulation mapping
processing by Discrete Fourier Transform (DFT)
precoding
layer mapping The next step in uplink data communication is resource element mapping 405 of the so-far processed uplink data to be transmitted. But in an aspect of embodiments consistent with the invention, the radar sequence can be generated (407) by a DSP in the modem 309. The available communication UL reference signal sequence, such as a Zadoff-Chu sequence typically used for a 5G sounding reference signal (SRS), can be used for this purpose.

The generated radar sequence is injected (409) directly to an OFDM Resource element mapping block 405 and then to the OFDM modulator (IFFT) 411 and beamformer 413 to generate an OFDM radar signal. As shown, the radar signal generation can be performed within the physical layer baseband processing. It is noted that this solution is compatible with the use of a cyclic prefix (CP).

In an aspect of some embodiments consistent with the invention, the OFDM modulator 411 has one parameter set for modem communication applications which must be compatible with applicable communication standards; and another parameter set for a radar application which can meet the radar performance requirements. For example, in a radar application, the OFDM subcarrier spacing of the OFDM modulator can be extended from 120 kHz to a much higher value (e.g., 1200 kHz). This leads to the duration of a radar OFDM symbol being reduced from 8.33 µs to 833 ns. In this way, both long radar pulses and short radar pulses can be generated. The short pulses are suitable for finding close in targets, and the long pulses for finding far away targets.

Figure 5:
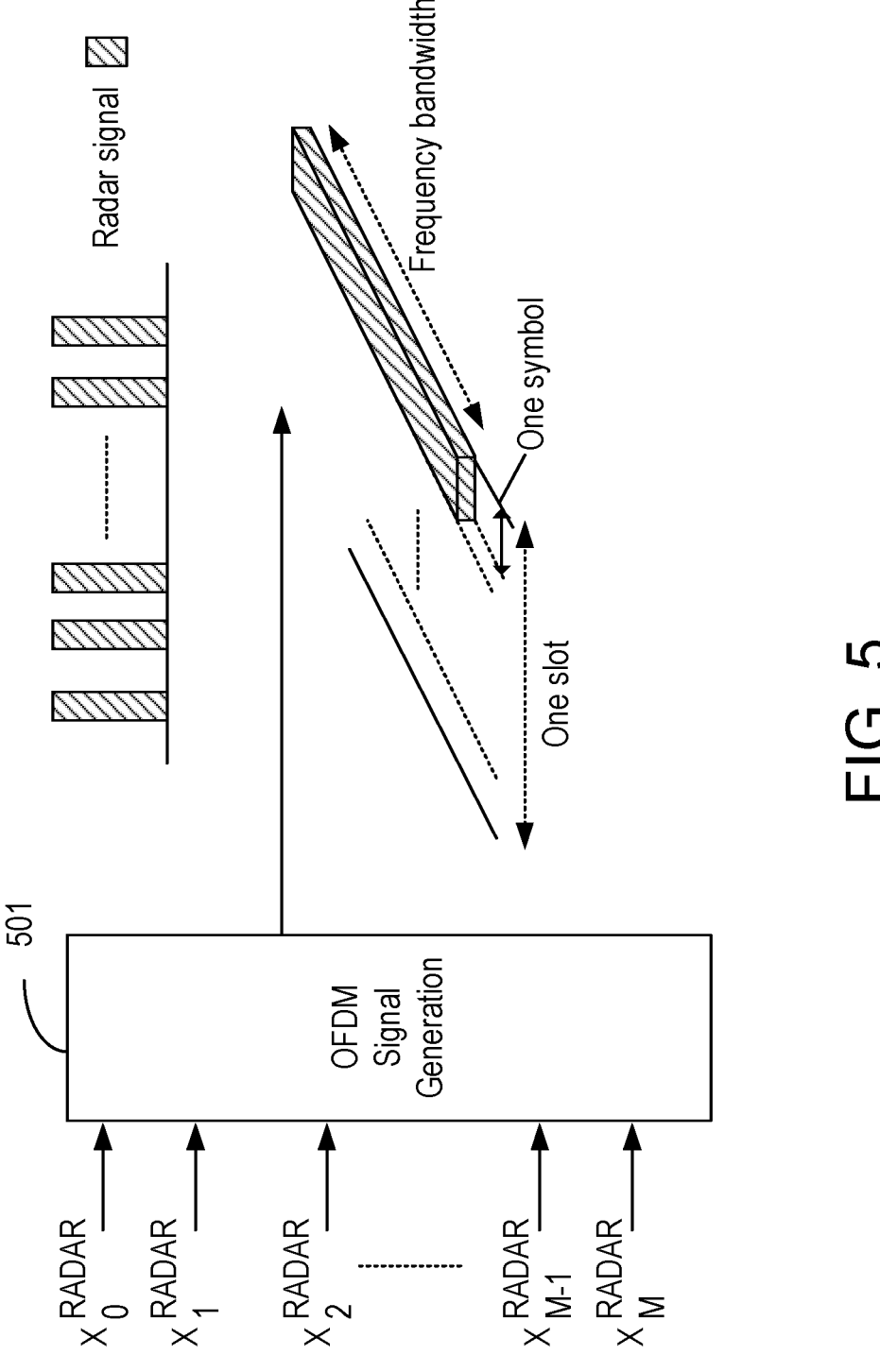
FIG. 5 is a diagram illustrating how an OFDM signal generator can produce a radar signal in the form of one single OFDM symbol, or as a series of symbols in a subframe/slot.

FIG. 5 is a diagram illustrating how an OFDM signal generator, such as the one just described with respect to FIG. 4, can produce a radar signal in the form of one single OFDM symbol, or as a series of symbols in a subframe/slot.

Focusing now on pulse radar signal generation, when the radar is associated with a device operating in monostatic mode, after each pulse there should be a listening interval, listening for a pulse of the type just sent. The amount of time during which listening should occur depends on the target range being aimed for (e.g., a short pulse typically corresponds to a short listening interval). To avoid false detection of targets, however, the time until the next pulse of the same type is listened for must exceed the maximum range of the system. This can be solved using different pulse modulations, and by alternatingly sending pulses of different length, so that a short pulse is followed by a long transmission during which there is no listening.

Figure 6A:
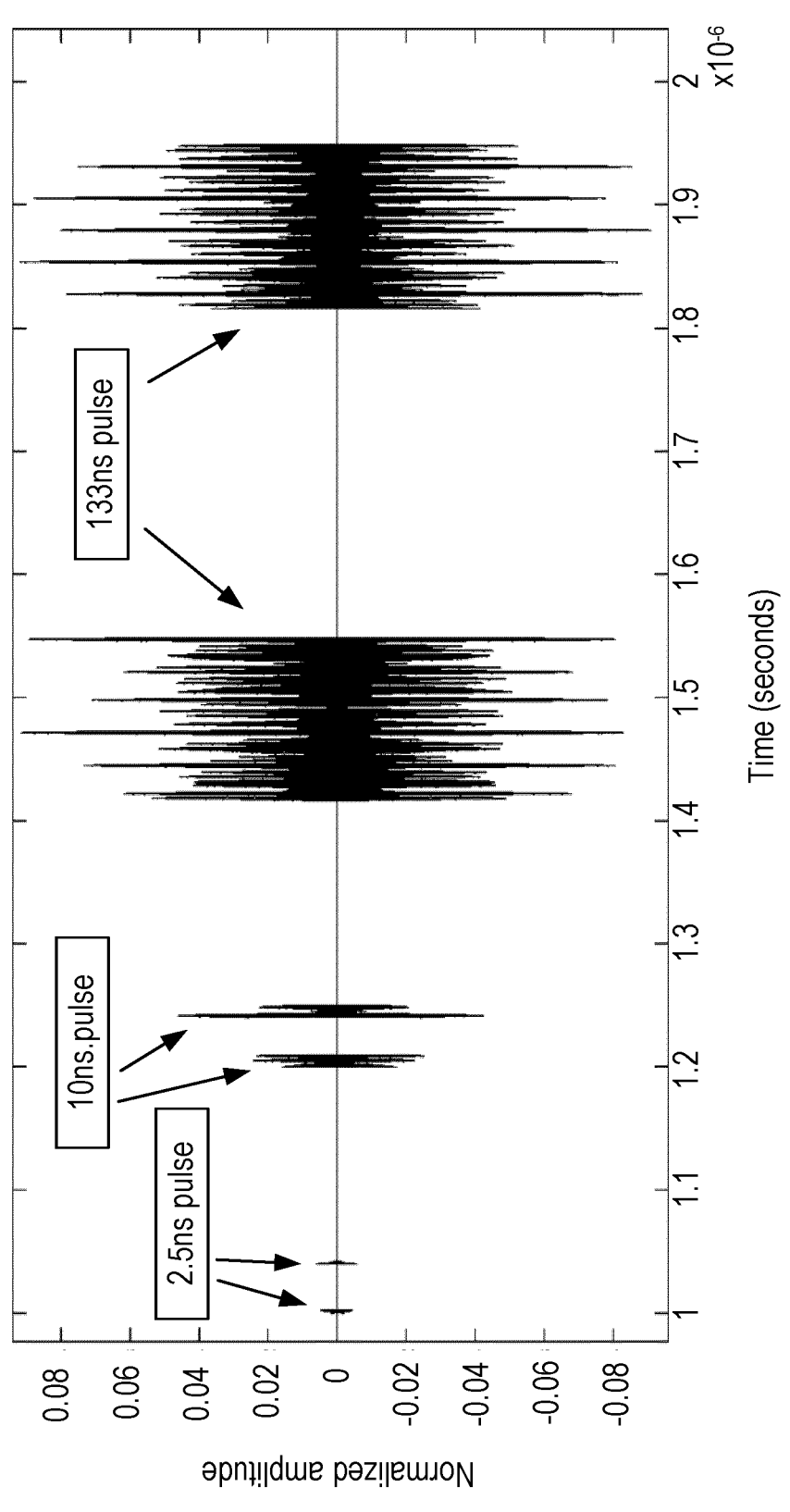
FIG. 6A is a graph of several different types of radar pulses generated on a 28 GHz main carrier and having different pulse widths and amplitudes.
Figure 6B:
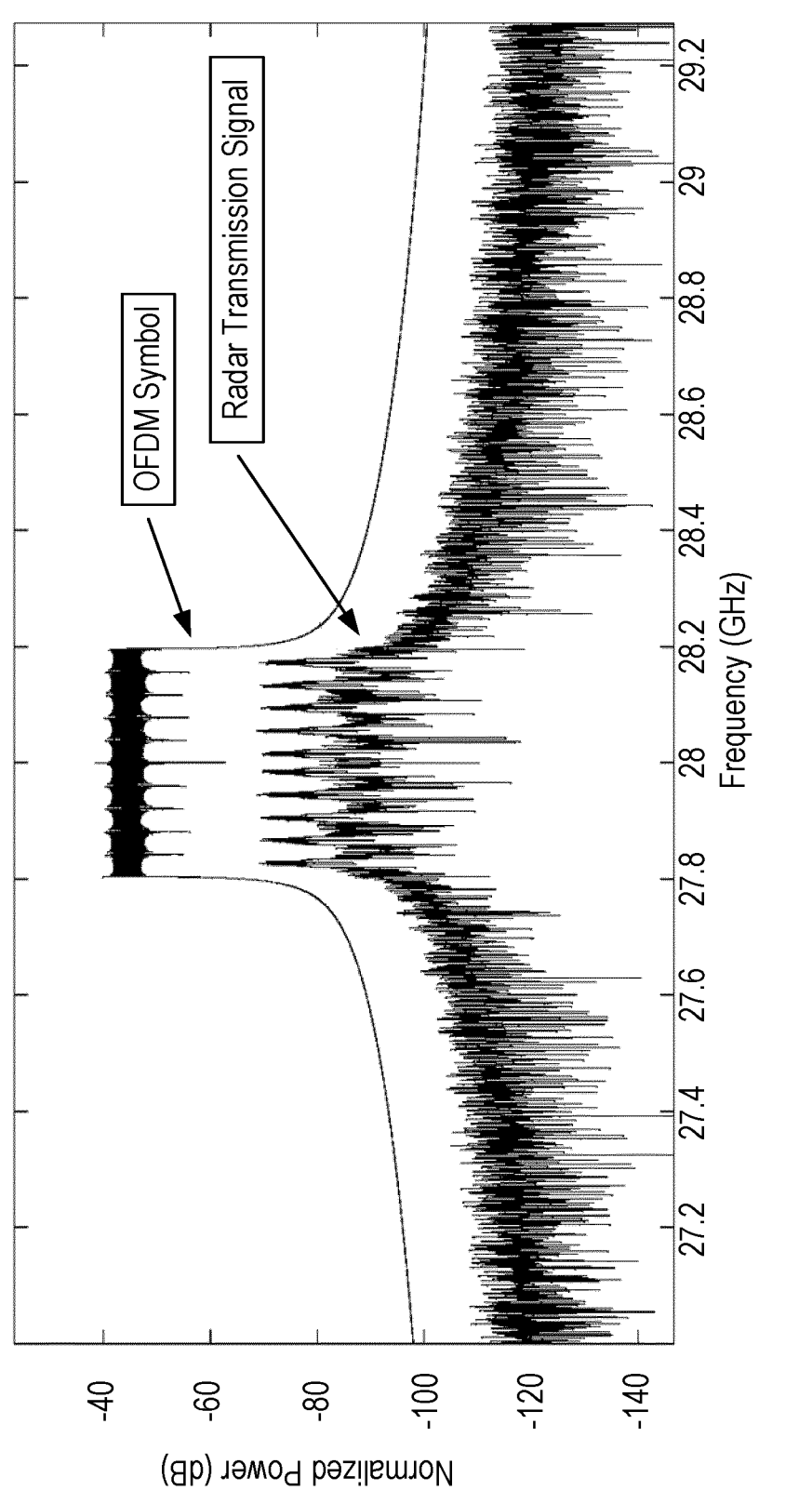
FIG. 6B is a graph showing a simulated frequency spectrum of a radar transmission.

In one embodiment, an OFDM symbol is generated by using a radar data sequence as a template. Time windows with different widths and/or amplitudes can be applied on the template to generate a train of radar pulses. FIG. 6A is a graph 600 of several different types of radar pulses generated on a 28 GHz main carrier and having different pulse widths and amplitudes. FIG. 6B is a graph showing a simulated frequency spectrum of a radar transmission. The radar pulses of FIG. 6A are generated by applying time windows on an OFDM symbol as follows:

a 2.5 ns window with an amplitude scaling factor=0.01,
a 10 ns window with an amplitude scaling factor=0.05, and
a 133 ns window with an amplitude scaling factor=0.1.

FIG. 6A illustrates the resultant waveforms of the radar pulses in the time domain and FIG. 6B illustrates a simulated frequency spectrum calculated from all of the radar pulses shown in FIG. 6A. In FIG. 6B, the OFDM signal is used as a reference whose maximum amplitude=1.

In an alternative embodiment, the radar baseband generates pulses and connects directly to the digital-to-analog converter.

Figure 7A:
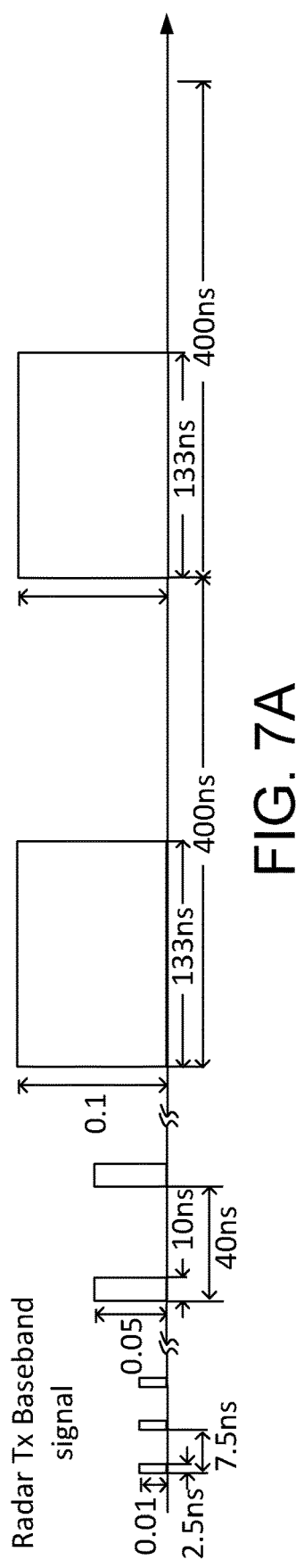
FIG. 7A illustrates different radar transmission baseband signals.

In yet another embodiment, the amplitude of the radar pulses can be controlled so that the short pulses have low amplitude while the long pulses have higher amplitude. With wider frequency bandwidth, the short pulses can be used to detect a target in short range with good resolution. With narrower frequency bandwidth and higher transmission power, the wide pulses can be used to detect a target in long range. The reduced power of the short pulses improves Adjacent Channel Leakage Ratio (ACLR). To further improve ACLR the ordering of the pulses should be optimized differently, for instance as shown in FIG. 7A, which illustrates different radar transmission baseband signals, and in FIG. 7B which illustrates the generated counterpart radar transmission RF signals.

It should not be inferred from this discussion, however, that pulse width and amplitude should always be linked as just described. To the contrary, there is no necessary coupling between pulse width and amplitude. For example, a short pulse with increased amplitude can find use with respect to enabling a longer detection distance with high resolution even though it presents a greater risk of causing interference to other devices.

In yet another embodiment, by adding phase/frequency modulation (e.g., a frequency sweep chirp) on the long pulse, it is possible to mitigate the problem of high spectral density at the center frequency.

As mentioned earlier, for example with reference to FIG. 3B, a baseband modem 303 of a communication device 301 can be further equipped to be capable of processing radar reflection signals, for example using a modem part 313 configured to process a received radar signal (e.g., by including a correlator) 313. Such capability can be implemented in the device 301 by using modem hardware or/and software. The correlator may use the transmitted OFDM radar pulses (or the radar sequence of the transmitted OFDM radar pulse) as the reference signal and apply a sliding window correlation between the reference signal and the received radar reflection signal. Then the correlation results are either processed and used in the mobile device (e.g., target range estimation) or sent to the modem communication UL block (e.g., via data link 315) which can be optionally transmitted to a network node (a base station or a server).

When running in monostatic mode, the reference signal of the correlator can be extracted from the local radar signal generator.

When the radar on the device is in bistatic (or multistatic) mode, a device acting as radar transmitter can send its radar sequence to a base station (or to another device by device-to-device (D2D) communication). A device acting as radar receiver can fetch the sequence of the transmitted radar signal via modem DL communication from the base station (or from another device via D2D communication).

As mentioned earlier, in advantageous embodiments the communication device 301 is configured to operate as a device in, for example, a 5G communication network. Therefore, coexistence with other network components is a consideration.

In one embodiment a device 301 can send a request to the base station it is connected to, asking for its radar application. The base station acknowledges the request and allocates radar radio resources for the device out of the pool of communication network resources. To assist the base station with the selection of appropriate resources, a device 301 may extract the required RF properties of its radar signal from the radar application layer and send the information to its modem which transmits the information further to a base station (or a server).

One benefit of this is that the base station can allocate RF resources for both radar and communication among the devices in the network. Therefore, interference to base stations and other devices can be avoided. The communication and radar functions can co-exist.

The radar function can be configured to operate in any of the following different ways:

as a time duplex function (radar and communication signals are allocated to different symbols in the time domain)

as a frequency duplex function (when the radar and communication signals allocated to different radio frequency spectrums)

as a polarization duplex function (modem and radar signals are allocated to different polarizations of an antenna panel) or as a spatial duplex function (modem and radar signals are allocated to different beams).

These duplex methods can also be combined. The radar signal of a device can also be aligned with communication signals in the time/frequency domain for the sake of power saving and interference avoidance. For example, the transmission/reception of radar signals can be scheduled in a way that bundles them with the device communication wakeup occasions (e.g., for paging) when the device is in the communications standard defined RRC IDLE/INACTIVE mode. Therefore, the device does not need a separate wakeup event to transmit/receive radar signals.

To further illustrate aspects of the technology consistent with the invention, a rough example with accompanying calculations will now be presented. Assume an available RF bandwidth of 400 MHz. In such a case, the radar pulses can be as short as 2.5 ns, which corresponds to 0.4 meters of minimum sensing distance. Adding a switch delay of 1 ns increases the minimum distance to about 0.6 meters. If the maximum distance to be sensed is 20 meters, then the pulse length becomes 133 ns. If the device listens for reflections for 266 ns a margin is provided that allows the measurement of echoes of targets with up to 40 meters distance. The total time for the long pulse and listening becomes 400 ns, while for the short pulse it is 7.5 ns. The average becomes 205 ns, so in the 8333 ns of an OFDM symbol it is possible to have 40 pulses of different lengths, for example in 0.5-meter distance steps.

Figure 7B:
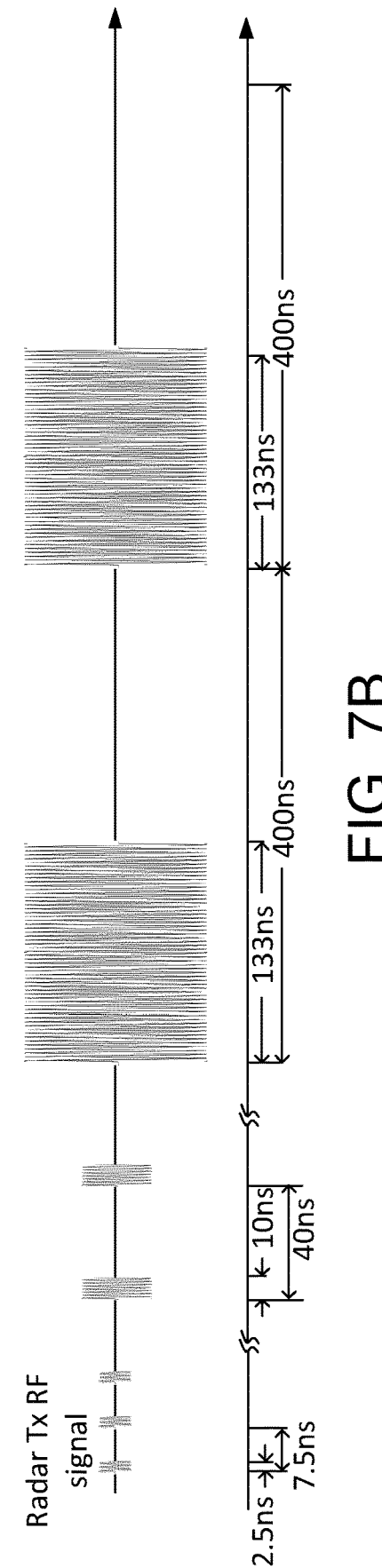
FIG. 7B illustrates the radar transmission RF signals generated from the signals of FIG. 7A.

To further illustrate this example, reference is again made to FIG. 7(a), which shows one example of a radar pulse train where the amplitude of the radar pulses is controlled—the 2.5 ns pulses with an amplitude of 0.01, the 10 ns pulses with an amplitude of 0.05 and the long 133 ns pulse with an amplitude of 0.1. FIG. 7B shows the time domain waveform when the waveform of FIG. 7A is upconverted to 28 GHz. One thing to note in this example: A linear chirp frequency modulation (the baseband frequency increasing from 0 Hz to 50 MHz) is recommended to be performed on the 133 ns long pulse to mitigate the problem of high spectral density at the center frequency though the chirp effect is not shown in the waveform in FIG. 7B.

Figure 8A:
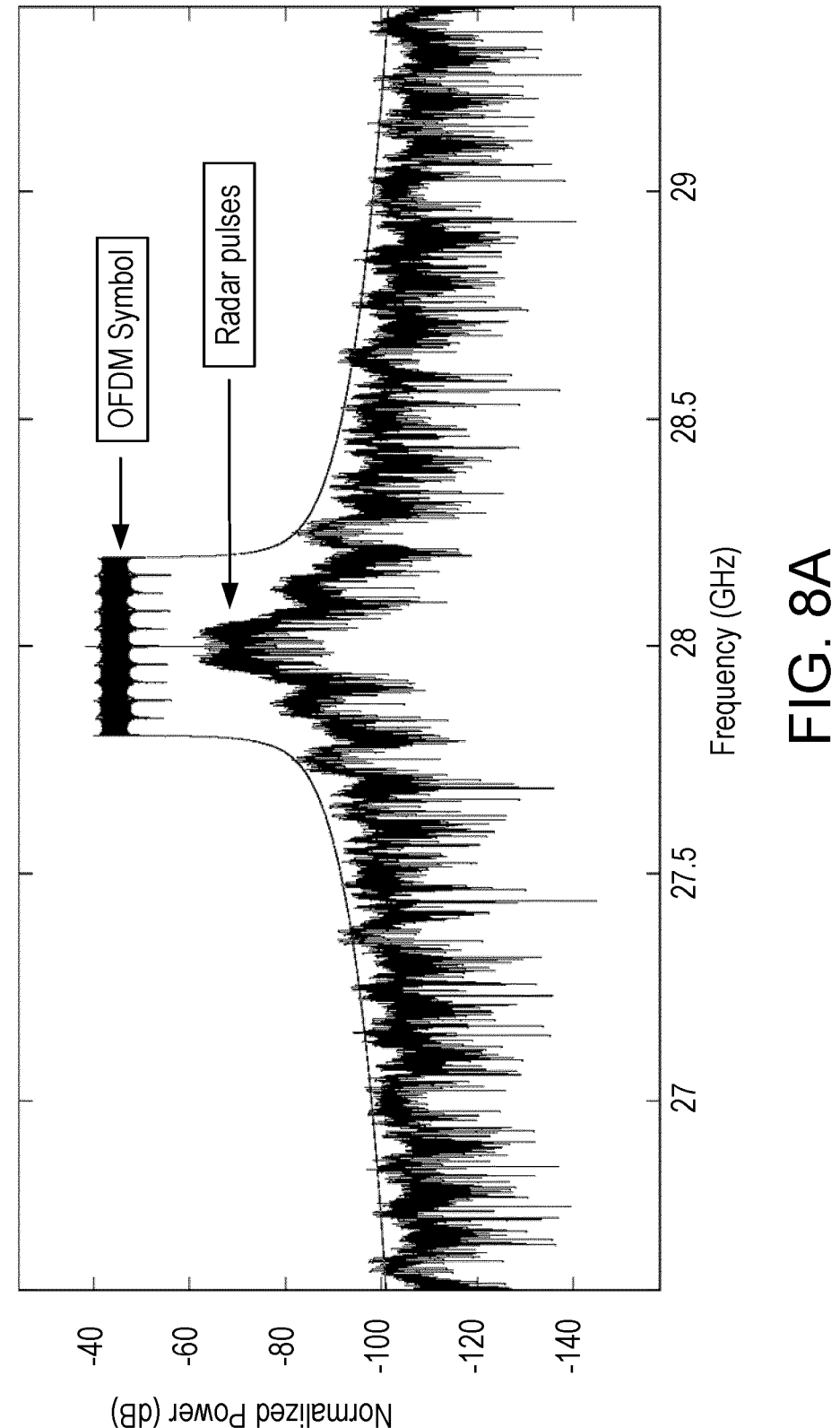
FIG. 8A shows a simulated frequency spectrum of radar pulses of 2.5 ns, 10 ns, and 133 ns all having the same amplitude of 0.1.
Figure 8B:
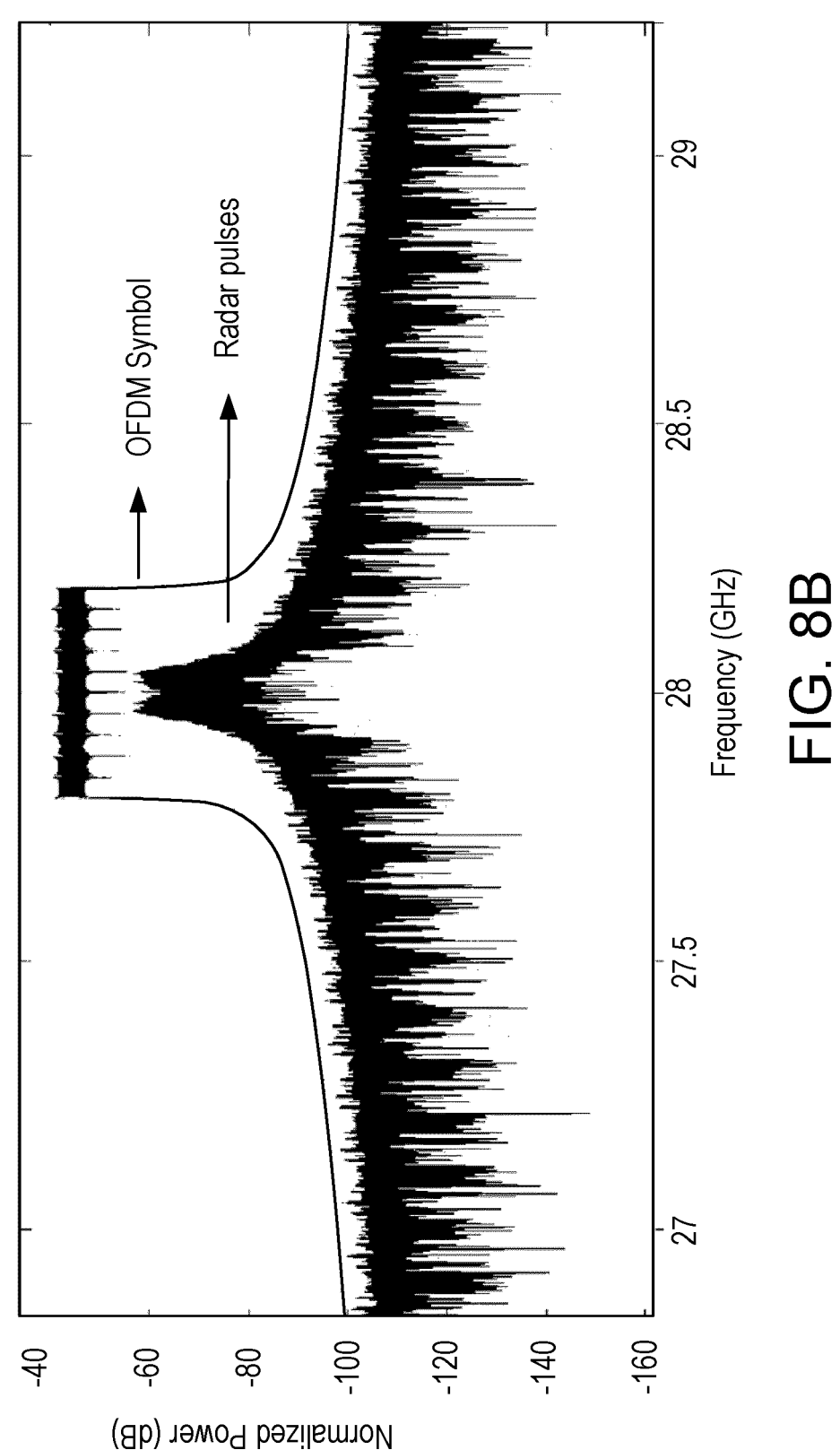
FIG. 8B shows a simulated frequency spectrum of radar pulses have durations as illustrated in FIG. 7B, but in which amplitudes are different.

FIG. 8A shows a simulated frequency spectrum of radar pulses of 2.5 ns, 10 ns, and 133 ns (see FIG. 7B) all have the same amplitude of 0.1. FIG. 8B shows a simulated frequency spectrum of radar pulses have durations as illustrated in FIG. 7B, but in which amplitudes are different such that the 2.5 ns pulse amplitude is 0.01, the 10 ns pulse amplitude is 0.05, and the 133 ns pulse amplitude is 0.1. In both FIGS. 8A and 8B, the OFDM signal with a maximum amplitude equal to 1 is used as a reference. The effect of the above-mentioned linear chirp modulation on the 133 ns long pulse is included in each of FIGS. 8A and 8B. Comparing the results of FIG. 8A (pulses all having same amplitude) with those of FIG. 8B (pulse amplitude reduced with decreasing pulse width), it can be seen that lowering the amplitude of the shorter pulse significantly reduces the RF power leakage to adjacent channels.

When the radar signal is increased to full amplitude (=1) in the 133 ns long pulses for maximum range, an effective ACLR was calculated by using the in-channel 400 MHz power of the OFDM signal divided by the adjacent channel power of the radar signal. The calculation results in ACLR1=40 dB (with ACLR1 corresponding to the 400 MHz channel spanning from 27.4 GHz to 28.8 GHz), ACLR2=47 dB (with ACLR2 corresponding to the 400 MHz channel spanning from 27 GHz to 27.4 GHz).

Using the radar equation (shown below), an estimate of the reflected signal power level was obtained from the transmitted radar pulses and the maximum detectable range. Considering a monostatic radar with a carrier frequency of 28 GHz and 400 MHz bandwidth, an antenna gain of the RF transceiver is assumed to be 20 dB and its receiver noise figure is 8 dB. The radar sensing target has a radar cross section area of 0.1 m$^2$. Below is the estimated RF link budget and maximum detectable range for radar pulses with different durations and different transmitted power levels.

$$R = \sqrt[4]{\frac{P_s G^2 \lambda^2 \sigma}{P_e (4\pi)^3}}$$

where, R is the distance between the radar and its sensing target;

$P_s$ is radar transmitted power (total radiation power, TRP value):

G is antenna gain, we are assuming the same antenna gain for radar Tx and Rx;

$\lambda$ is wavelength of transmitted radar signal;

$\sigma$ is radar cross-section of the radar sensing target;

$P_e$ is the minimum required received power.

| | Pulse #1 | Pulse #2 | Pulse #3 |
|---|---|---|---|
| $P_s$ (TRP) | 27 dBm | 0 dBm | −30 dBm |
| Pulse duration | 400 ns | 10 ns | 2.5 ns |
| Detectable SNR at Rx input | −10.7 dB | 5.5 dB | 15.5 dB |
| Processing gain | 30 dB | 14 dB | 9 dB |
| SNR with processing gain | 11.4 dB | 11.4 dB | 11.4 dB |
| Maximum detectable range | 120 m | 10 m | 1.33 m |

Above illustrates how different pulse lengths (400 ns, 10 ns, and 2.5 ns in the example) and power levels are adapted to different distances. This can be made available to applications so that, depending on needs, the device can use different types and amplitudes of pulses dependent on needs (close or far distances) or whether a suite of pulses to scan the environment across a distance interval shall be used. Furthermore, depending on the risk of interference, it might be acceptable to use pulses with lower amplitude without restrictions whereas pulses with higher output power must be restricted and might require coordination from the base station.

Figures 9A, 9B:
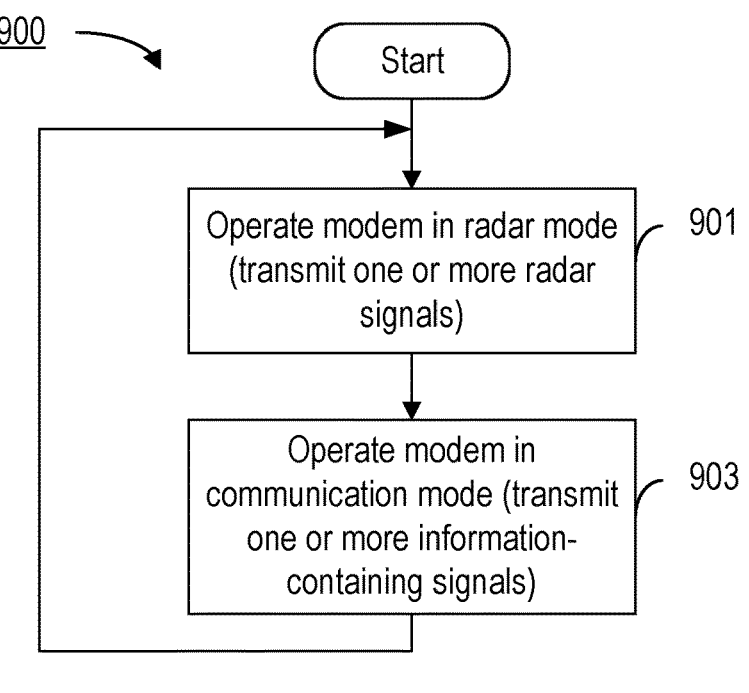
FIGS. 9A and 9B are, in one respect, flowcharts of actions in accordance with exemplary embodiments corresponding to uplink data and radar processing.

Referring now to FIGS. 9A and 9B, these are, in one respect, flowcharts of actions in accordance with exemplary embodiments corresponding to uplink data and radar processing as described above. In another respect, the blocks depicted in FIGS. 9A and 9B can also be considered to represent means 900, 950 (e.g., hardwired or programmable circuitry or other processing means) for carrying out the described actions.

FIG. 9A illustrates the case in which radar transmissions and transmissions of uplink data occur in sequence. The order is not essential: in FIG. 9A, the modem is operated in radar mode (step 901) followed by the modem being operated in communication mode (step 903) in which one or more information-containing signals are transmitted.

By contrast, FIG. 9B illustrates the case in which through any one or combination of a number of different possible ways as described above (e.g., time duplex (radar and communication signals are allocated to different symbols in time domain), frequency duplex (when the radar and communication signals are allocated to different radio frequency spectrums), polarization duplex (modem and radar signals are allocated to different polarizations of an antenna panel), or spatial duplex), the modem is operated in radar mode (step 951) concurrently with operation of the modem in communication mode (step 953).

Figure 10:
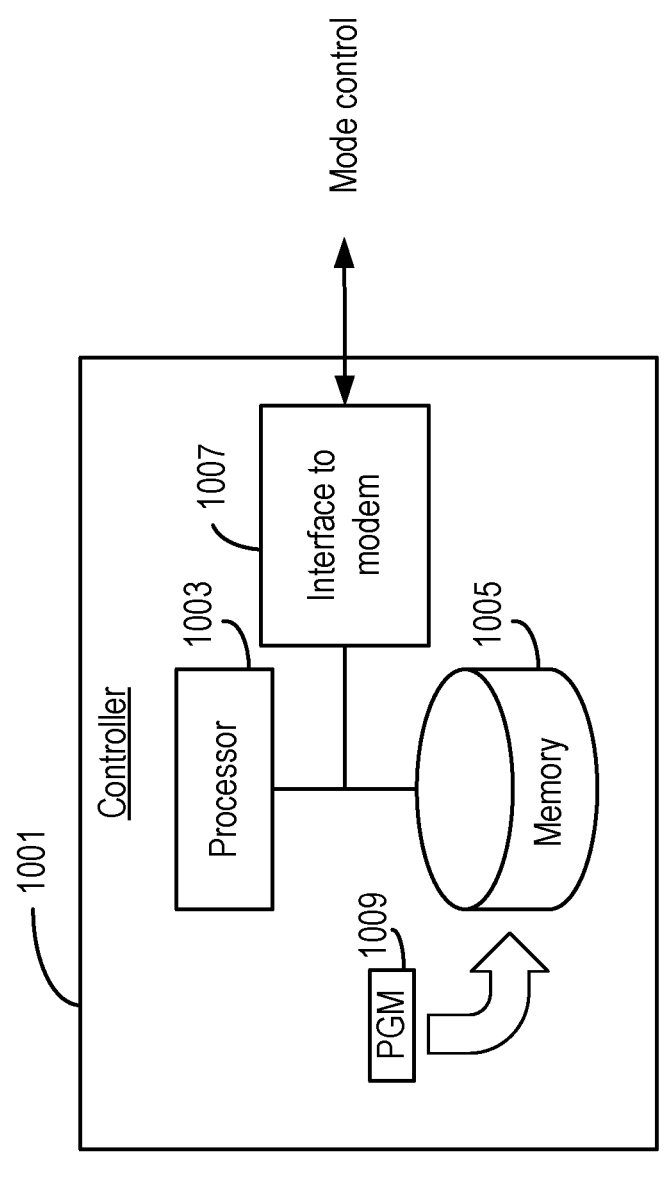
FIG. 10 illustrates an exemplary controller in accordance with some but not necessarily all exemplary embodiments consistent with the invention.

Aspects of an exemplary controller 307 that may be employed to cause any and/or all of the above-described actions to be performed as discussed in the various embodiments is shown in FIG. 10, which illustrates an exemplary controller 1001 in accordance with some but not necessarily all exemplary embodiments consistent with the invention. In particular, the controller 1001 includes circuitry configured to carry out any one or any combination of the various functions described above (e.g., as illustrated in FIGS. 2A through 9). Such circuitry could, for example, be entirely hard-wired circuitry (e.g., one or more Application Specific Integrated Circuits—"ASICs"). Depicted in the exemplary embodiment of FIG. 10, however, is programmable circuitry, comprising a processor 1003 coupled to one or more memory devices 1005 (e.g., Random Access Memory, Magnetic Disc Drives, Optical Disk Drives, Read Only Memory, etc.) and to an interface 1007 that enables bidirectional communication with other elements of the hardware. The memory device(s) 1005 store program means 1009 (e.g., a set of processor instructions) configured to cause the processor 1003 to control other system elements so as to carry out any of the aspects described above. The memory device(s) 1005 may also store data (not shown) representing various constant and variable parameters as may be needed by the processor 1003 and/or as may be generated when carrying out its functions such as those specified by the program means 1009.

The examples presented so far have all based generation of a radar symbol on the use of an OFDM symbol, but this is not essential to the technology. to the contrary, other types of waveforms can also be generated by the communication device 101, for example Frequency Modulation Continuous Wave (FMCW), and used as a radar signal.

Moreover, the technology is not limited to use in only 3GPP communication devices, but can be extended to communication devices using unlicensed spectrum (e.g. communication devices having a main carrier frequency of 60 GHz).

In some other alternative embodiments, radar transmission need not be coordinated by a central network node. For example, when a device is detecting a target in a short range by using short pulses with low RF transmission power, there is less probability of interference on its base station or other devices. Hence, the coordination by the base station is not needed or not always needed.

In some other alternative embodiments, some variation of the illustrated radar waveforms can be exploited as an RF carrier for data communication.

One potential use case for the technology described herein is in an industrial setting, where there are mobile units (e.g., autonomous carts) that are equipped with a UE for communication and general guidance. In order to navigate properly, both for fine-tuning their position relative to a map as well as to avoid obstacles that might appear, the availability of a radar functionality would be of high value. With a radar function built into the UE, there is no need to add an additional dedicated radar module.

Furthermore, multiple radar reflectors can be placed in the industrial setting, which can be used by the UE to calibrate its radar, extend radar sensing range and improve radar detectability.

In such a use case, the needed detection range could be between a few decimeters to several tens of meters—when it is far from wall and equipment, there could be a need to range more distant objects for positioning, but as it gets closer to obstacles it needs to accurately detect up close. In some scenarios, the frequency at which such radar sensing is needed (e.g., how often) relates to how far the vehicle is from obstacles or points of interest combined with the speed of the vehicle, and as it gets closer to obstacles it is likely to need sensing more often.

The above methods and implementations provide the means to sweep the radar sensing at a broad range of distances, from about 100 meters down to a few meters.

It will be appreciated that the various aspects of embodiments consistent with the invention provide a number of advantages over conventional radar technology, including but not limited to:

A low-cost radar solution for a mmWave communication device is provided by making only small hardware modifications without requiring the addition of a dedicated radar chip The radar function can use the full dynamic range of the transceiver to achieve a long detection range.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A communication device comprising:

a modem comprising digital baseband circuitry for generating a digital baseband signal for transmission;

a transceiver configured to receive the digital baseband signal from the modem and to generate therefrom a radiofrequency signal for transmission by the communication device; and a controller configured to control the modem in each of first and second modes, wherein:

the first mode is a radar mode in which the modem generates radar baseband signals for transmission as one or more radar radiofrequency signals by the transceiver; and the second mode is a communication mode in which the modem generates information-containing baseband signals for transmission by the transceiver; and wherein:

when operating in the first mode, the modem is configured to generate a radar baseband sequence and to generate the radar baseband signal from the radar baseband sequence by supplying the radar baseband sequence to an Orthogonal Frequency Division Multiplexing (OFDM) modulator, wherein the radar baseband sequence is configured to cause the transceiver to generate the one or more radar radiofrequency signals as one or more OFDM pulses; and when operating in the second mode, the modem is configured to supply data representing information to the OFDM modulator, wherein the data representing information causes the transceiver to generate the radiofrequency signal as information-containing OFDM symbols.

2. The communication device of claim 1, wherein the modem further comprises radar signal processing circuitry, and wherein the modem is configured to receive a baseband radar reflection signal from the transceiver and to operate the radar signal processing circuitry using the received baseband radar reflection signal as input.

3. The communication device of claim 2, wherein the radar signal processing circuitry comprises a correlator that is configured to use the radar baseband signals as reference signals against which the baseband radar reflection signal is compared.

4. The communication device of claim 1, wherein the modem is configured to supply the radar baseband sequence to a resource element mapping portion of the OFDM modulator that is also used by the modem when operating in the second mode.

5. The communication device of claim 1, further comprising beamforming circuitry for causing the one or more radar radiofrequency signals to be transmitted in a directional beam.

6. The communication device of claim 1, wherein the transceiver is included in an antenna panel.

7. The communication device of claim 1, wherein the communication device is configured to select the radar baseband sequence from at least a first radar baseband sequence and a second radar baseband sequence, wherein the first radar baseband sequence causes the one or more radar radiofrequency signals to have a first pulse width and a first amplitude, and the second radar baseband sequence causes the one or more radar radiofrequency signals to have a second pulse width and a second amplitude, wherein the radar radiofrequency signals produced from the first radar baseband sequence differ from the radar radiofrequency signals produced from the second radar baseband sequence by at least one of:

the first pulse width having a different duration than the second pulse width; and the first amplitude having a different magnitude than the second amplitude.

8. The communication device of claim 7, wherein the communication device is configured to base selection of the radar baseband sequence on a targeted detection range interval.

9. The communication device of claim 1, wherein the communication device is configured to transmit the one or more radar radiofrequency signals using an unlicensed portion of a radiofrequency spectrum.

10. The communication device of claim 1, wherein the communication device is configured to operate in a time duplex mode in which transmission of the one or more radar radiofrequency signals and reception of radar reflection signals occur at non-overlapping times.

11. The communication device of claim 1, wherein the communication device is configured to operate in a full duplex mode in which transmission of the one or more radar radiofrequency signals and reception of radar reflection signals occur at overlapping times.

12. The communication device of claim 1, wherein the communication device is a millimeter wave (mmWave) communication device.

13. The communication device of claim 12, wherein the communication device is configured for operation in a 5G communication network.

14. The communication device of claim 1, wherein the communication device is configured to operate in the first mode and the second mode concurrently.

15. A method of operating a communication device that comprises a modem and a transceiver, wherein the modem comprises digital baseband circuitry for generating a digital baseband signal for transmission, and the transceiver is configured to receive the digital baseband signal from the modem and to generate therefrom a radiofrequency signal for transmission by the communication device, the method comprising:

controlling the modem to operate in a first mode; and controlling the modem to operate in a second mode, wherein:

the first mode is a radar mode in which the modem generates radar baseband signals for transmission as one or more radar radiofrequency signals by the transceiver; and the second mode is a communication mode in which the modem generates information-containing baseband signals for transmission by the transceiver;

wherein the method comprises:

when operating in the first mode, generating a radar baseband sequence and generating the radar baseband signal from the radar baseband sequence by supplying the radar baseband sequence to an Orthogonal Frequency Division Multiplexing (OFDM) modulator, wherein the radar baseband sequence is configured to cause the transceiver to generate the one or more radar radiofrequency signals as one or more OFDM pulses; and when operating in the second mode, supplying data representing information to the OFDM modulator, wherein the data representing information causes the transceiver to generate the radiofrequency signal as information-containing OFDM symbols.

16. The method of claim 15, wherein the modem further comprises radar signal processing circuitry, and wherein controlling the modem to operate in the first mode comprises:

receiving a baseband radar reflection signal from the transceiver; and operating the radar signal processing circuitry using the received baseband radar reflection signal as input.

17. The method of claim 16, further comprising:

performing a signal correlation using the radar baseband signals as reference signals against which the baseband radar reflection signal is compared.

18. The method of claim 15, wherein supplying the radar baseband sequence to the OFDM modulator comprises supplying the radar baseband sequence to a resource element mapping portion of the OFDM modulator that is also used by the modem when operating in the second mode.

19. The method of claim 15, further comprising causing the one or more radar radiofrequency signals to be transmitted in a directional beam.

20. The method of claim 15, wherein the transceiver is included in an antenna panel.

21. The method of claim 15, further comprising:

using one or more antenna panels when transmitting the one or more radar radiofrequency signals.

22. The method of claim 15, comprising:

selecting the radar baseband sequence from at least a first radar baseband sequence and a second radar baseband sequence, wherein the first radar baseband sequence causes the one or more radar radiofrequency signals to have a first pulse width and a first amplitude, and the second radar baseband sequence causes the one or more radar radiofrequency signals to have a second pulse width and a second amplitude, wherein the radar radiofrequency signals produced from the first radar baseband sequence differ from the radar radiofrequency signals produced from the second radar baseband sequence by at least one of:

the first pulse width having a different duration than the second pulse width; and the first amplitude having a different magnitude than the second amplitude.

23. The method of claim 22, wherein the communication device is configured to base selection of the radar baseband sequence on a targeted detection range interval.

24. The method of claim 15, comprising:

transmitting the one or more radar radiofrequency signals using an unlicensed portion of a radiofrequency spectrum.

25. The method of claim 15, comprising:

operating in a time duplex mode in which transmission of the one or more radar radiofrequency signals and reception of radar reflection signals occur at non-overlapping times.

26. The method of claim 15, comprising:

operating in a full duplex mode in which transmission of the one or more radar radiofrequency signals and reception of radar reflection signals occur at overlapping times.

27. The method of claim 18, wherein the communication device is a millimeter wave (mmWave) communication device.

28. The method of claim 27, wherein the communication device is configured for operation in a 5G communication network.

29. The method of claim 15, wherein controlling the modem to operate in the first mode is performed concurrently with controlling the modem to operate in the second mode.

30. A non-transitory computer readable storage medium comprising instructions that, when executed by at least one processor, causes the at least one processor to carry out a method of operating a communication device that comprises a modem and a transceiver, wherein the modem comprises digital baseband circuitry for generating a digital baseband signal for transmission, and the transceiver is configured to receive the digital baseband signal from the modem and to generate therefrom a radiofrequency signal for transmission by the communication device, the method comprising:

controlling the modem to operate in a first mode; and controlling the modem to operate in a second mode, wherein:

the first mode is a radar mode in which the modem generates radar baseband signals for transmission as one or more radar radiofrequency signals by the transceiver; and the second mode is a communication mode in which the modem generates information-containing baseband signals for transmission by the transceiver; and wherein the method comprises:

when operating in the first mode, generating a radar baseband sequence and generating the radar baseband signal from the radar baseband sequence by supplying the radar baseband sequence to an Orthogonal Frequency Division Multiplexing (OFDM) modulator, wherein the radar baseband sequence is configured to cause the transceiver to generate the one or more radar radiofrequency signals as one or more OFDM pulses; and when operating in the second mode, supplying data representing information to the OFDM modulator, wherein the data representing information causes the transceiver to generate the radiofrequency signal as information-containing OFDM symbols.

\* \* \* \* \*